W. J. BURKE.
SIGNALING DEVICE FOR MOTOR VEHICLES.
APPLICATION FILED DEC. 28, 1908.

1,133,002.

Patented Mar. 23, 1915.

WITNESSES
H. C. Abbott
V. E. Markmann

INVENTOR
William J. Burke
BY Griffins Bernhard
ATTORNEYS

THE NORRIS PETERS CO., PHOTO-LITHO., WASHINGTON, D. C.

UNITED STATES PATENT OFFICE.

WILLIAM J. BURKE, OF NEW YORK, N. Y.

SIGNALING DEVICE FOR MOTOR-VEHICLES.

1,133,002.  Specification of Letters Patent.  Patented Mar. 23, 1915.

Application filed December 28, 1908. Serial No. 469,626.

*To all whom it may concern:*

Be it known that I, WILLIAM J. BURKE, a citizen of the United States, residing in the city of New York, borough of Manhattan, county and State of New York, have invented a certain new and useful Signaling Device for Motor-Vehicles, of which the following is a specification.

This invention is an improved device adapted to be placed on moving vehicles in general, but in view of its particular adaptability and usefulness on motor vehicles, I will describe its advantages and applicability thereto.

When several vehicles are moving along a road, following each other in succession as is usual, the front vehicle is frequently brought to a sudden stop, either by signal of an officer at cross roads, or by some obstacle or defect in the roadway. Under these circumstances, accidents frequently happen due to the collision of a rear vehicle with the one in front of it, the driver of the rear vehicle not having observed, or being in a position to observe, the cause which occasioned the first vehicle to stop, and the driver of the first vehicle having no means of signaling the vehicle following him.

The present invention is designed to overcome the foregoing, and other, disadvantages in that it embodies means whereby a driver of a forward vehicle can signal a following vehicle in a simple and expeditious manner.

The invention embodies, among other things, a signaling device adapted to be attached to a vehicle, preferably at the rear part thereof, in conjunction with mechanism for manually operating the same by an occupant of the vehicle, preferably the driver.

In a preferred form of the invention the signal is in the form of a sign containing on one of its faces a suitable warning, which face is normally hidden from view, but which may be exposed to view whenever the driver deems it necessary to signal a following vehicle.

In the practical embodiment of the invention, I have made the sign out of transparent material and associated it with the "tail light" ordinarily used on automobiles, so that said light may be reflected through the sign at night, thereby permitting the use of the signal either in daylight or at night.

In the accompanying drawings I have illustrated one practical embodiment of the invention, but the construction shown therein is to be understood as illustrative, only, and not as defining the limits of the invention.

Figure 1:
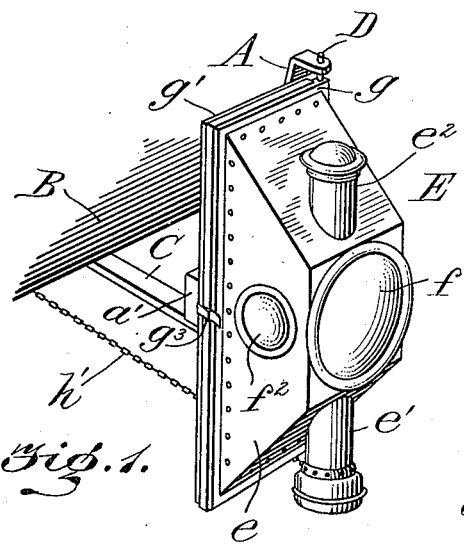
Figure 2:
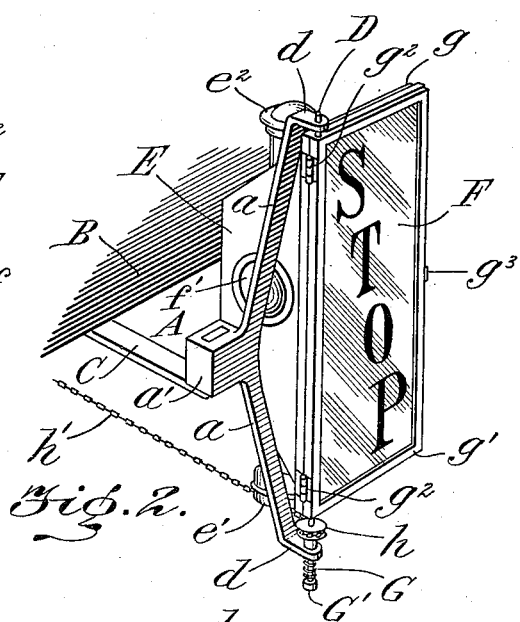
Figure 3:
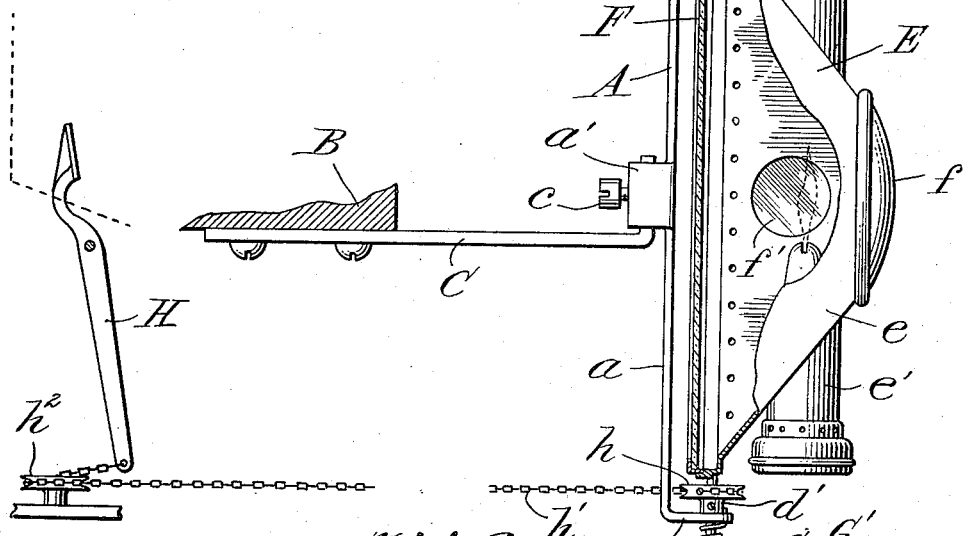

Figure 1 is a perspective view illustrating my signaling device in position on a vehicle, such as an automobile, and adapted to expose the lamp for the purpose of serving as a "tail light" for a vehicle. Fig. 2 is a perspective view showing the signal in a reverse position to Fig. 1 whereby the sign of the signal is exposed to view. Fig. 3 is a vertical section partly in elevation of the signal on an enlarged scale, said figure showing one form of operating means adapted to reverse the position of the signal.

A designates a supporting member hereis shown as a bracket having inclined arms, $a, a$, and a boss or socket, $a'$. The particular form of bracket, A, is not a material part of the invention, but the form shown is adapted for supporting my new signaling device on a vehicle. A part of said vehicle is indicated by the reference character, B, and it is shown as having a rearwardly extending arm, C. Said arm fits in the boss or socket, $a'$, of the supporting member, and a binding screw, $c$, is employed for clamping member, A, to arm, C, as shown in Figs. 2 and 3, whereby the signal device is detachably fastened on the rear part of an automobile or other vehicle.

Supporting member, A, is shown as having lugs, $d$, at the end portions thereof, and in these lugs are journaled the end portions of a rock shaft, D, the latter occupying a vertical position within the supporting member, A. Said shaft is shown as having a collar, $d'$, adapted to rest upon the lower arm, $d$, of member, D, whereby the shaft is mounted in the supporting member so as to preclude endwise movement of the shaft therein.

Shaft, D, carries a lamp, E, and a transparent member, F, the latter composing a sign adapted to be illuminated by the lamp. As shown in the drawings, lamp, E, comprises a hood or reflector, $e$, a font, $e'$, and a chimney, $e^2$, said lamp being provided with colored glasses, $f, f', f^2$. The glass, $f$, is at the rear part of the lamp, whereas other glasses, $f', f^2$, are at the sides of said lamp. It is not desired, however, to limit the invention to the particular form of lamp just described and illustrated in the drawings for the reason that other forms of lamps may be employed, and other means for illuminating the sign may be provided as a part of the signaling device. As shown, the hood or reflector, e, is formed or provided at its edge with a marginal frame, g, and the sign, F, is held or secured in another marginal frame, g'. Said frames are hinged or united at one edge, as at g² in Fig. 2, while the other edges of the marginal frames, g, g', are secured detachably to each other by a suitable form of clasp shown at g³ in Fig. 1. The lamp and the sign are hinged together as described in order that said lamp may be swung outwardly from the sign when it is desired to obtain access to the inside of said lamp for the purpose of cleaning the hood or the glasses, or for trimming the wick. Normally, the sign and lamp are retained in their closed positions by the latch, g³.

Rock shaft, D, passes through, and is rigidly secured in marginal frame, g, of the lamp, whereby said lamp, E, and sign, F, are mounted on said rock shaft to turn therewith within supporting member, A. The lower part of rock shaft, D, passes through the lower end, d, of member, A, and on this part of the shaft is loosely arranged a coiled spring, G. One end of said spring is anchored on supporting member, A, whereas the other end of the spring is fastened to the collar, G', secured rigidly to the rock shaft. Said spring acts on rock shaft for the purpose of turning the sign and the lamp to the positions shown in Figs. 1 and 3, whereby the sign is obscured from view by the lamp, and said lamp is exposed at the rear of the vehicle so as to display the light through glasses, f, f', f², when the signal is used in the night time.

For the purpose of exposing the sign to view I employ means adapted to be operated at will by a driver or other occupant of the vehicle so as to reverse the lamp and the sign from the position of Figs. 1 and 3, and cause said parts to assume the position shown in Fig. 2, thereby exposing sign, F, to the view of a driver or occupant of a vehicle following the one equipped with the signal device. One means for reversing the lamp and the sign are shown in Figs. 2 and 3 of the drawings as a pulley, h, secured rigidly to rock shaft, D, preferably at the lower part thereof, and around this pulley passes a chain, cable, or other flexible connection h', which leads to and around a guide sheave, h², the other end of said cable or chain, h', being secured to a lever or treadle, H. Said treadle is supported in the front part of a vehicle or automobile so as to be within convenient reach of the driver.

The sign, F, is herein shown as a transparent or translucent pane of glass, mica, or other material. Said sign is positioned across the open, front side of the lamp, and the hood, e, extends to the edges of the sign, whereby said hood acts as a reflector to throw the rays of light against and through said sign, throughout the depth and width thereof. The sign is provided with a suitable inscription to convey the signal to the driver or occupant of a following vehicle. As shown in Fig. 2 the inscription on the sign consists of the word "Stop", but it is evident that other words, phrases, etc., may be provided on the sign.

The operation of the invention will be readily understood from the prior description, but it may be summarized briefly as follows: The device is applied to arm, C, at the rear part of the vehicle, and the chain or cable, h', is connected to lever, H. Spring, G, acts ordinarily to hold the rock shaft in a position wherein lamp, E, is exposed to the view of a driver or occupant of a following vehicle, and this lamp operates to obscure or conceal sign F, as in Figs. 1 and 3. When the driver of the vehicle is signaled to stop by an officer, or should it become necessary to stop the vehicle by an obstacle in the road, the driver operates lever, H, and chain, h', whereupon pulley h, turns shaft, D, against the tension of spring, G. Said shaft reverses the position of lamp, E, and sign, F, and the structure swings as a unit to the position shown in Fig. 2, the entire structure making a half turn. This operation brings sign, F, into view so that it may be read by the driver or occupant of a following vehicle, whereas lamp, E, is caused to assume a position at the rear of the transparent sign. The sign, F, is adapted to be read in the daylight so as to convey the signal to the driver or occupant of a following vehicle. In the night time, the wick of lamp E, is lighted so that said lamp serves as a "tail light" for the vehicle when the parts are in the positions of Figs. 1 and 3, whereas the operation of reversing the sign so as to display it brings the lighted lamp into position at the rear of the sign, whereby the light of the lamp is displayed thereon and the latter is rendered visible in the night time for the purpose of conveying the stop warning or signal to the driver or occupant of a following vehicle.

Having thus fully described the invention, what I claim as new, and desire to secure by Letters Patent is:

In a signaling device for automobiles and the like, a supporting member adapted to be fastened to the rear part of the vehicle, a lamp casing pivotally supported in said member for rotation on a vertical axis exterior of the vertical, medial line of the casing for the purpose of allowing the casing to be shifted from one side of the medial line of vision to the opposite side thereof, a lamp in said casing, a lens and a transparent sign carried by the casing at the opposite sides thereof, means for normally retaining the casing on one side of the medial line of vision in which position the sign is concealed and the lens exposed to view rearwardly of the vehicle, whereby the lamp and lenses serve the purpose of a tail light, and means for manually swinging the casing about its axis through an arc of a circle to a position at the other side of the medial line of vision for the purpose of exposing the sign to view rearwardly of the vehicle and hiding the lens.

In testimony whereof I have signed my name to this specification in the presence of two subscribing witnesses.

WILLIAM J. BURKE.

Witnesses:
 WALTER J. BRENNAN,
 H. I. BERNHARD.